(12) United States Patent
Cortese

(10) Patent No.: US 7,028,604 B2
(45) Date of Patent: Apr. 18, 2006

(54) COFFEE MACHINE

(75) Inventor: Virginio Cortese, Turin (IT)

(73) Assignee: SGL Italia S.r.l., Turin (IT)

( * ) Notice: Subject to any disclaimer, the term of this patent is extended or adjusted under 35 U.S.C. 154(b) by 396 days.

(21) Appl. No.: 10/246,750

(22) Filed: Sep. 19, 2002

(65) Prior Publication Data

US 2003/0070554 A1    Apr. 17, 2003

(30) Foreign Application Priority Data

Sep. 21, 2001    (IT) .......................... TO2001A0902

(51) Int. Cl.
A47J 31/34    (2006.01)
(52) U.S. Cl. ...................... 99/295; 99/302 R
(58) Field of Classification Search .............. 99/295, 99/302 R, 287
See application file for complete search history.

(56) References Cited

U.S. PATENT DOCUMENTS

| | | | |
|---|---|---|---|
| 2,968,560 A | 1/1961 | Goros | |
| 3,403,617 A * | 10/1968 | Lampe | 99/295 |
| 3,408,921 A | 11/1968 | Freese | |
| 3,596,588 A * | 8/1971 | Moss | 99/282 |
| 3,607,297 A * | 9/1971 | Fasano | 426/433 |
| 5,472,719 A | 12/1995 | Favre | |
| 5,762,987 A * | 6/1998 | Fond et al. | 426/433 |

* cited by examiner

*Primary Examiner*—Reginald L. Alexander
(74) *Attorney, Agent, or Firm*—Shlesinger, Arkwright & Garvey LLP

(57) ABSTRACT

A coffee machine comprises a pressurized hot water sprinkler faces a dispenser cup housing a rigid sealed capsule closed by a deformable end wall; and the dispenser cup has a piercing device for piercing the end wall of the sealed capsule, when the end wall is permanently deformed outwards, by a number of conical needles facing the sprinkler and housed inside the dispenser cup; each needle having a conical outer surface, an inner conduit, and at least one axial slit formed in the conical outer surface to connect the relative inner conduit, in use, to the inside of the sealed capsule through the relative end wall.

9 Claims, 3 Drawing Sheets

COFFEE MACHINE

The present invention relates to a coffee machine.

More specifically, the present invention relates to a coffee machine of the type comprising a pressurized hot water sprinkler; a dispenser cup facing said sprinkler and movable with respect to the sprinkler to and from an infusion position in which the dispenser cup is fitted to said sprinkler, said dispenser cup having a percolator spout, and a cavity communicating with said percolator spout and for housing a rigid sealed capsule for a measure of ground coffee, the sealed capsule being closed, at one end, by a sealing film facing the sprinkler in use, and, at the other end, by an end wall; a first piercing device carried by said sprinkler to pierce, in use, said sealing film; and a second piercing device carried by said dispenser cup to pierce, in use, said end wall when the end wall is permanently deformed outwards.

BACKGROUND OF THE INVENTION

Normally, in known coffee machines of the type described above, when the dispenser cup is fitted to the sprinkler in the infusion position, the first piercing device pierces the sealing film of the sealed capsule inside the dispenser cup, and pressurized hot water is fed into the sealed capsule. The pressure and temperature combine so that the end wall of the sealed capsule, which is normally made of relatively thin thermoplastic material, is deformed outwards into contact with the second piercing device, which pierces it to allow the liquid coffee to flow out of the sealed capsule to the percolator spout.

In known machines of the type described above, the second piercing device is normally defined by a relatively large number of relatively thin, crochet-hook-shaped needles projecting axially from an end surface of the dispenser cup.

In actual use, given their relatively large number and irregular shape, the needles have been found to produce tears in the end wall of the sealed capsule, thus resulting in poor control of infusion flow from the sealed capsule and in dreg spillage. Poor infusion flow control is further compounded by the relatively large number of needles used—which, being so many, fail to pierce the sealed capsule simultaneously—and by the relatively large infusion flow passage formed by each needle in the end wall of the sealed capsule.

SUMMARY OF THE INVENTION

It is an object of the present invention to provide a coffee machine of the type described above, designed to eliminate the aforementioned drawbacks.

According to the present invention, there is provided a coffee machine comprising a pressurized hot water sprinkler; a dispenser cup facing said sprinkler and movable with respect to the sprinkler to and from an infusion position in which the dispenser cup is fitted to said sprinkler, said dispenser cup having a percolator spout, and a cavity communicating with said percolator spout and for housing a rigid sealed capsule for a measure of ground coffee, the sealed capsule being closed, at one end, by a sealing film facing the sprinkler in use, and, at the other end, by an end wall; a first piercing device carried by said sprinkler to pierce, in use, said sealing film; and a second piercing device carried by said dispenser cup to pierce, in use, said end wall when the end wall is permanently deformed outwards; characterized in that said second piercing device comprises a plate housed in a fixed position inside said cavity to divide the cavity into a first portion for housing said sealed capsule, and a second portion communicating with said percolator spout, and a number of conical needles projecting from said plate towards said sprinkler; each said needle having a conical outer surface preferably of a base diameter at least equal to half its height, an inner conduit extending through said plate to communicate with said second portion, and at least one opening, preferably a slit, formed through said conical outer surface to connect said inner conduit to said first portion.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
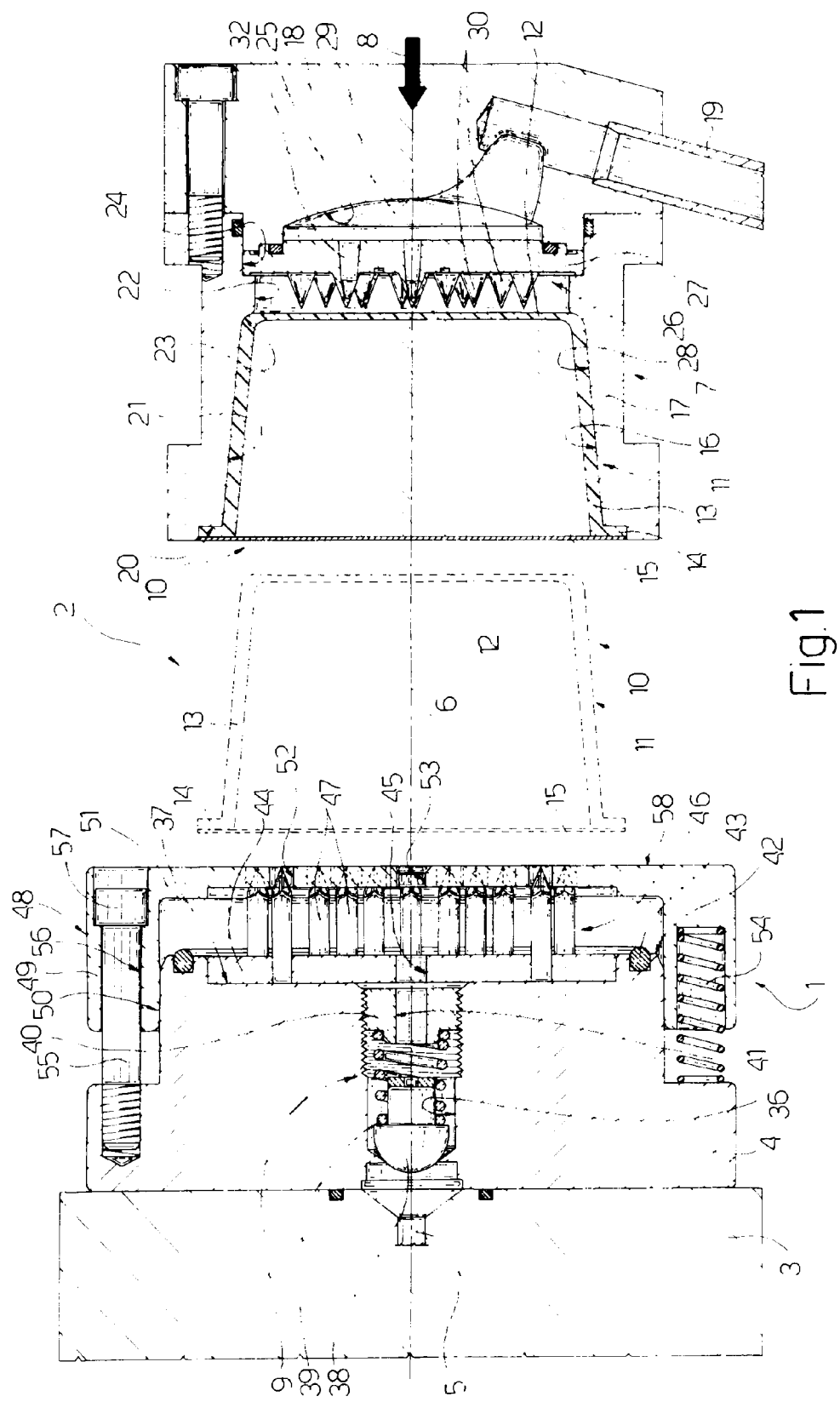
FIGS. 1 and 2 show schematic axial sections, with parts removed for clarity and in two different operating positions, of a preferred embodiment of an infusion assembly of the coffee machine according to the present invention.

Number 1 in FIG. 1 indicates as a whole a coffee machine having an infusion assembly 2 comprising a boiler 3, a sprinkler 4 carried by boiler 3 and supplied by boiler 3 with pressurized hot water along a feed conduit 5 coaxial with sprinkler 4 along an axis 6, and a dispenser cup 7 facing sprinkler 4 and moved to and from sprinkler 4 by a known actuating device (not shown) in a direction 8 substantially parallel to axis 6, and between a loading position (FIG. 1) detached from sprinkler 4, and an infusion position (FIG. 2) fitted to sprinkler 4. Pressurized hot water flow along feed conduit 5 to sprinkler 4 is controlled by a one-way valve 9 set, as explained in detail later on, to only open when the pressure in the portion of feed conduit 5 upstream from valve 9 reaches a given value.

Dispenser cup 7 houses a ground coffee container defined by a known rigid sealed capsule 10, which comprises a cup-shaped body 11 made of thermoplastic material, containing a measure of ground coffee, and in turn comprising a normally flat, relatively thin, continuous end wall 12, and a continuous truncated-cone-shaped lateral wall 13 tapering towards end wall 12 and having an outer annular flange 14 at the opposite end to that connected to end wall 12. Sealed capsule 10 is completed by a sealing film 15 fitted in fluidtight manner to flange 14 to seal the measure of ground coffee inside cup-shaped body 11.

Dispenser cup 7 comprises a cavity 16 open at the end facing sprinkler 4 and shown coaxial with axis 6 for the sake of simplicity. In this connection, it should be pointed out, however, that, as it moves in direction 8, dispenser cup 7 may possibly be oscillated, in known manner not shown, about an axis crosswise to direction 8. Dispenser cup 7 comprises a tubular lateral wall 17, which is closed, at the end facing away from sprinkler 4, by an end wall 18 fitted through with a percolator spout 19, and has an inner annular seat 20 at the end facing sprinkler 4. Lateral wall 17 has an inner surface defined, as of annular seat 20, by a truncated-cone-shaped surface 21 and a cylindrical surface 22, which are coaxial with each other and with axis 6, and are connected to each other by an annular shoulder 23; and, close to end wall 18, cylindrical surface 22 has an annular groove 24 close to a concave end surface 25 formed in end wall 18.

Dispenser cup 7 houses sealed capsule 10 with lateral wall 13 contacting truncated-cone-shaped surface 21 and against annular shoulder 23, with flange 14 housed inside annular seat 20, and with end wall 12 a given distance from annular groove 24.

In a variation not shown, annular seat 20 is dispensed with, and truncated-cone-shaped surface 21 is shorter than sealed capsule 10, which, when housed inside dispenser cup 7, therefore projects partly outwards of dispenser cup 7 towards sprinkler 4.

Dispenser cup 7 is fitted inside with a piercing device 26 comprising a substantially circular plate 27, the outer periphery of which is housed in fluidtight manner inside annular groove 24 to divide cavity 16 into an outer portion 28 housing sealed capsule 10, and an inner portion 29 communicating with percolator spout 19.

Piercing device 26 also comprises a number of conical needles 30, each of which projects from plate 27 towards sprinkler 4 and has a conical outer surface 31, the base diameter of which is at least equal to half its height and the corresponding height of relative needle 30. Each needle 30 is of a length approximately equal to but no greater than the distance between annular shoulder 23 and annular groove 24, and has an inner conduit 32 extending along relative needle 30 and through plate 27 to communicate, at one end, directly with inner portion 29 of cavity 16, and, at the other end, with outer portion 28 of cavity 16 through a number of slits 33, each of which extends along a generating line of relative conical outer surface 31. More specifically, in the example shown, each needle 30 comprises three slits 33 equally spaced about an axis 34 of relative conical outer surface 31, and relative inner conduit 32 is substantially in the form of a triangular pyramid having a number of edges 35, along each of which opens a relative slit 33.

In a variation not shown, slits 33 are other than three in number, and, if more than three, inner conduit 32 is substantially in the form of a pyramid having a number of edges 35 equal to the number of relative slits 33.

Sprinkler 4 has a through hole 36, which defines an end portion of feed conduit 5, is coaxial with axis 6, and comes out inside a cylindrical cavity 37 formed in sprinkler 4, coaxial with axis 6, and facing dispenser cup 7. Hole 36 is controlled by valve 9, which comprises a shutter 38, and a spring 39 compressed between shutter 38 and a plug 40 closing the outlet end of hole 36. An axial hole 41 is formed through plug 40 to connect cavity 37 to hole 36 downstream from shutter 38.

Cavity 37 is surrounded by an annular groove formed in a flat annular end surface 42 of sprinkler 4 and housing an annular sealing member 43, which projects frontwards from annular surface 42 and surrounds a plate 44 fixed inside cavity 37 and having a central through hole 45 communicating with hole 41 and coaxial with axis 6.

Plate 44 forms part of a piercing device 46 and, on the side facing dispenser cup 7, has a number of substantially cylindrical needles 47 integral with plate 44 and extending, parallel to axis 6, from plate 44 towards dispenser cup 7. In addition to plate 44 and needles 47, piercing device 46 also comprises a cup-shaped body 48 coaxial with axis 6, positioned with its concavity facing cavity 37, and fitted in axially sliding manner to sprinkler 4. Cup-shaped body 48 comprises a cylindrical lateral wall 49, an inner surface of which mates in sliding manner with a cylindrical outer surface 50 of sprinkler 4; and an end wall 51 parallel to and facing annular surface 42, and having a number of holes 52, each coaxial with a respective needle 47, and a central hole 53 coaxial with axis 6.

Cup-shaped body 48 is movable axially—in opposition to a number of axial springs 54 compressed between sprinkler 4 and lateral wall 49, and along a number of pins 55 projecting axially from sprinkler 4 and sliding through respective axial holes 56 formed in the thickness of lateral wall 49—from a rest position (FIG. 1) defined by stop members defined by respective heads 57 of pins 55, and wherein needles 47 are housed entirely inside cup-shaped body 48, to a work position (FIG. 2) in which end wall 51 contacts sealing member 43, and needles 47 project from an outer surface 58 of end wall 51 through respective holes 52.

Figure 2:
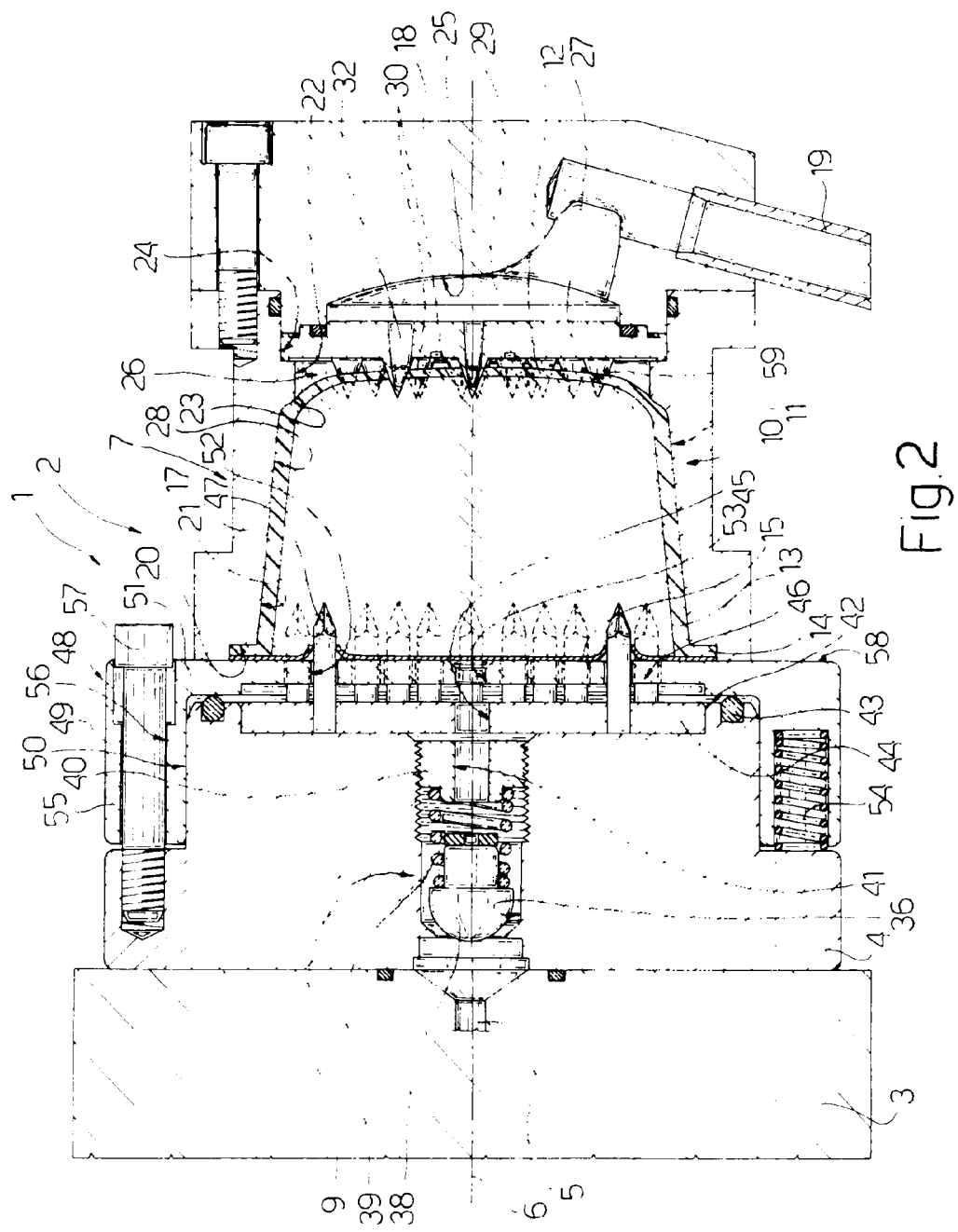
Figure 3:
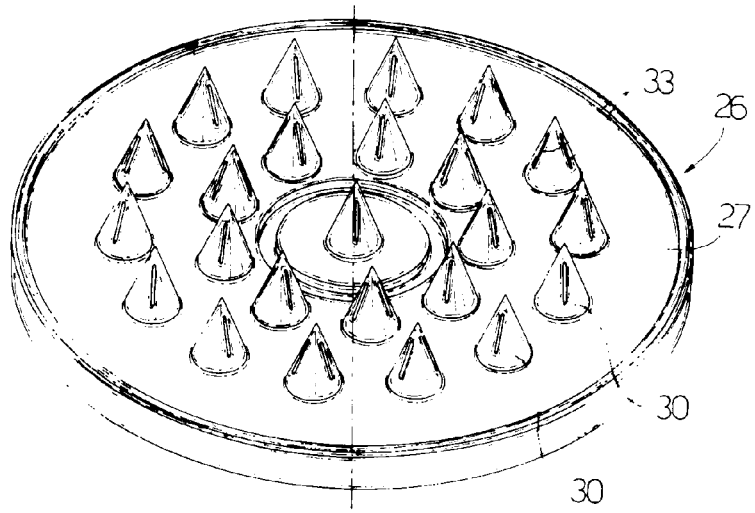
FIGS. 3 and 4 show respective top and bottom views in perspective of a detail in FIGS. 1 and 2.
Figure 4:
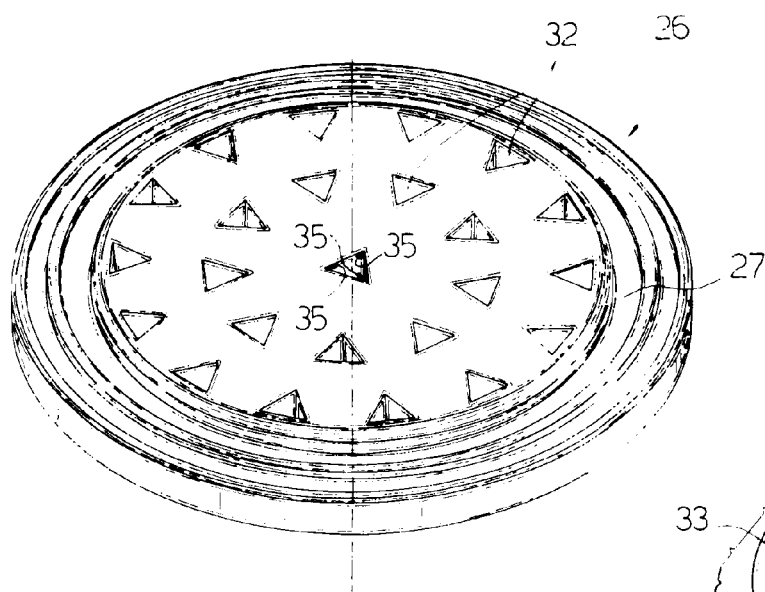
Figure 6:
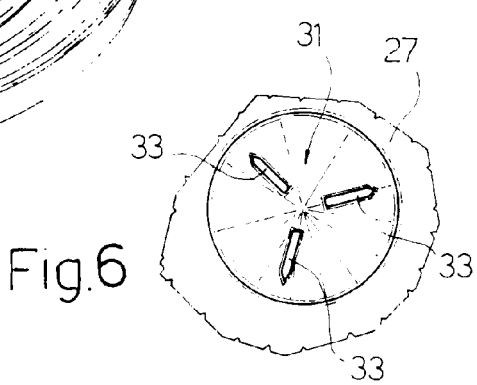
FIG. 6 shows a larger-scale plan view of a detail in FIG. 3.
Figure 5:
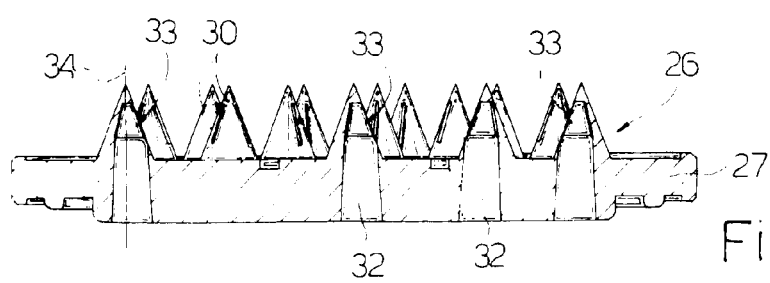
FIG. 5 shows a cross section of the FIG. 3 and 4 detail.

In actual use, dispenser cup 7, on receiving sealed capsule 10 in the FIG. 1 loading position, is moved in direction 8 into the FIG. 2 infusion position by said known actuating device (not shown), which is normally a hydraulic cylinder supplied with pressurized hot water in parallel with feed conduit 5 and at a pressure below that opening valve 9.

Once dispenser cup 7 is moved towards sprinkler 4, sealed capsule 10, upon sealing film 15 coming to rest in fluidtight manner on outer surface 58 of end wall 51 of cup-shaped body 48, slides cup-shaped body 48 axially along sprinkler 4 in opposition to springs 54, which are compressed to allow needles 47 to project from end wall 51 and pierce sealing film 15.

When end wall 51 contacts sealing member 43 (FIG. 2) and is arrested in the withdrawn stop position, the pressure upstream from valve 9 increases to open valve 9, so that pressurized hot water flows through holes 41 and 45 into a chamber defined by plate 44 and by end wall 51 in the withdrawn stop position against sealing member 43. Once the chamber is filled, the pressurized hot water flows into sealed capsule 10 through central hole 53 and the holes (FIG. 2) formed by needles 47 through sealing film 15, and the heat and pressure of the water gradually deform end wall 12 of sealed capsule 10 outwards, so that needles 30 gradually pierce end wall 12.

Being perfectly conical, needles 30 form perfectly round holes 59 (FIG. 2) through end wall 12, with stress distributed substantially evenly along the periphery of each hole 59, thus preventing the formation, along the periphery of each hole 59, of any unevenness capable of initiating, in end wall 12, tears through which part of the ground coffee may be forced out by the pressurized hot water, and which may define a privileged flow path for the water, so that only part of the ground coffee participates in the infusion process. Moreover, being conical, needles 30 are relatively few in number and all pierce end wall 12 simultaneously, thus improving infusion flow control.

Once end wall 12 is pierced by needles 30, the coffee flows out from sealed capsule 10 through slits 33 and along conduits 32, and through inner portion 29 of cavity 16 to percolator spout 19.

In connection with the above, it should be pointed out that slits 33 define calibrated infusion flow passages enabling optimum infusion flow control and preventing coffee dregs from reaching inner portion 29 of cavity 16.

The invention claimed is:
1. A coffee machine comprising:
a pressurized hot water sprinkler;
a dispenser cup facing said sprinkler and movable with respect to the sprinkler to and from an infusion position in which the dispenser cup is fitted to said sprinkler, said dispenser cup having a percolator spout, and a cavity communicating with said percolator spout and for housing a rigid sealed capsule for a measure of ground coffee, the sealed capsule being closed, at one end, by a sealing film facing the sprinkler in use, and, at the other end, by an end wall;

a first piercing device carried by said sprinkler to pierce, in use, said sealing film; and a second piercing device carried by said dispenser cup to pierce, in use, said end wall when the end wall is permanently deformed outwards;

said second piercing device comprising a plate housed in a fixed position inside said cavity to divide the cavity into a first portion for housing said sealed capsule, and a second portion communicating with said percolator spout, and a number of conical needles projecting from said plate towards said sprinkler;

each said needle having a conical outer surface, an inner conduit extending through said plate to communicate with said second portion, and at least one opening formed through said conical outer surface to connect said inner conduit to said first portion;

said first piercing device comprising a number of further needles movable towards said dispenser cup from a withdrawn rest position to an extracted piercing position;

said further needles extending from said sprinkler towards said dispenser cup, and being fixed with respect to the sprinkler; and said first piercing device further comprising a cup-shaped body having a perforated end wall for the passage of said further needles, and fitted in sliding manner to said sprinkler so as to move, in opposition to elastic means, from a normal rest position wherein said further needles are housed inside said cup-shaped body, to a work position wherein said further needles extend outwards of said cup-shaped body through respective holes in said perforated end wall.

2. A coffee machine as claimed in claim 1 and also comprising shoulder means formed inside said first portion and which cooperate with said sealed capsule to lock the sealed capsule axially with the relative end wall, when undeformed, substantially contacting a free end of each of said needles.

3. A coffee machine as claimed in claim 1, wherein said conical outer surface has a base diameter at least equal to half a height of the relative needle.

4. A coffee machine as claimed in claim 1, wherein said opening is a slit extending along a generating line of said conical surface.

5. A coffee machine as claimed in claim 1, wherein each said needle comprises a number of said openings defined by respective slits extending along respective generating lines of the relative said conical outer surface.

6. A coffee machine as claimed in claim 5, wherein said generating lines are equally spaced about an axis of the relative said conical outer surface.

7. A coffee machine as claimed in claim 5, wherein said inner conduit is substantially in the form of a pyramid having a number of edges; each said slit communicating with said inner conduit along a relative said edge.

8. A coffee machine as claimed in claim 7, wherein said slits are three in number, and said pyramid is a triangular pyramid.

9. A coffee machine comprising:

a pressurized hot water sprinkler;

a dispenser cup facing said sprinkler and movable with respect to the sprinkler to and from an infusion position in which the dispenser cup is fitted to said sprinkler, said dispenser cup having a percolator spout, and a cavity communicating with said percolator spout and for housing a rigid sealed capsule for a measure of ground coffee, the sealed capsule being closed, at one end, by a sealing film facing the sprinkler in use, and, at the other end, by an end wall;

a first piercing device carried by said sprinkler to pierce, in use, said sealing film;

a second piercing device carried by said dispenser cup to pierce, in use, said end wall when the end wall is permanently deformed outwards;

said second piercing device comprising a plate housed in a fixed position inside said cavity to divide the cavity into a first portion for housing said sealed capsule, and a second portion communicating with said percolator spout, and a number of tubular needles projecting from said plate towards said sprinkler;

each said tubular needle allowing communication between said first and second portions;

said first piercing device comprising a number of further needles which extend from said sprinkler towards said dispenser cup, and are fixed with respect to the sprinkler; and said first piercing device further comprising a cup-shaped body having a perforated end wall for the passage of said further needles, and fitted in sliding manner to said sprinkler so as to move, in opposition to elastic means, from a normal rest position wherein said further needles are housed inside said cup-shaped body, to a work position wherein said further needles extend outwards of said cup-shaped body through respective holes in said perforated end wall.

* * * * *